United States Patent [19]

Nuber et al.

[11] Patent Number: 5,742,623
[45] Date of Patent: Apr. 21, 1998

[54] ERROR DETECTION AND RECOVERY FOR HIGH RATE ISOCHRONOUS DATA IN MPEG-2 DATA STREAMS

[75] Inventors: Ray Nuber, La Jolla; Paul Moroney, Olivenhain, both of Calif.

[73] Assignee: General Instrument Corporation of Delaware, Chicago, Ill.

[21] Appl. No.: 678,108

[22] Filed: Jul. 11, 1996

Related U.S. Application Data

[63] Continuation-in-part of Ser. No. 511,266, Aug. 4, 1995, Pat. No. 5,598,415.

[60] Provisional application No. 60/017,467, May 10, 1996.

[51] Int. Cl.$^6$ .................................. H04L 1/00; H04L 7/00
[52] U.S. Cl. ........................... 371/47.1; 371/57.2; 371/65
[58] Field of Search .............................. 371/47.1, 57.1, 371/57.2, 61, 65

[56] References Cited

U.S. PATENT DOCUMENTS

| | | | |
|---|---|---|---|
| 5,289,276 | 2/1994 | Siracusa et al. | 348/467 |
| 5,497,404 | 3/1996 | Grover et al. | 375/357 |
| 5,517,250 | 5/1996 | Hoogenboom et al. | 348/467 |
| 5,588,029 | 12/1996 | Maturi et al. | 375/364 |

*Primary Examiner*—Stephen M. Baker
*Attorney, Agent, or Firm*—Barry R. Lipsitz

[57] ABSTRACT

Error recovery is provided for isochronous data ("isodata") obtained from a data stream. Isodata transport packets are monitored to locate isodata presentation time stamps (PTSs). The presentation of isodata from a buffer is synchronized to a system time clock (STC) using timing information derived from the PTSs. Discontinuity errors between said isodata transport packets are identified and, if a discontinuity of no more than one packet is identified, a write pointer of the buffer is advanced by a suitable number of bits to compensate for the discontinuity, while maintaining the synchronization of the presentation with respect to the STC. Additional error detection and recovery techniques are disclosed, including the maintenance of a presentation unit counter, the use of a PTE extension and PTS offset to verify output timing, the provision of a pair of PTS pointers verifying correct output data timing, the use of a packet elementary stream (PES) count to detect lost data in the transport stream, and the detection and discarding of packets designated as encrypted after any decryption should have already been completed.

34 Claims, 5 Drawing Sheets

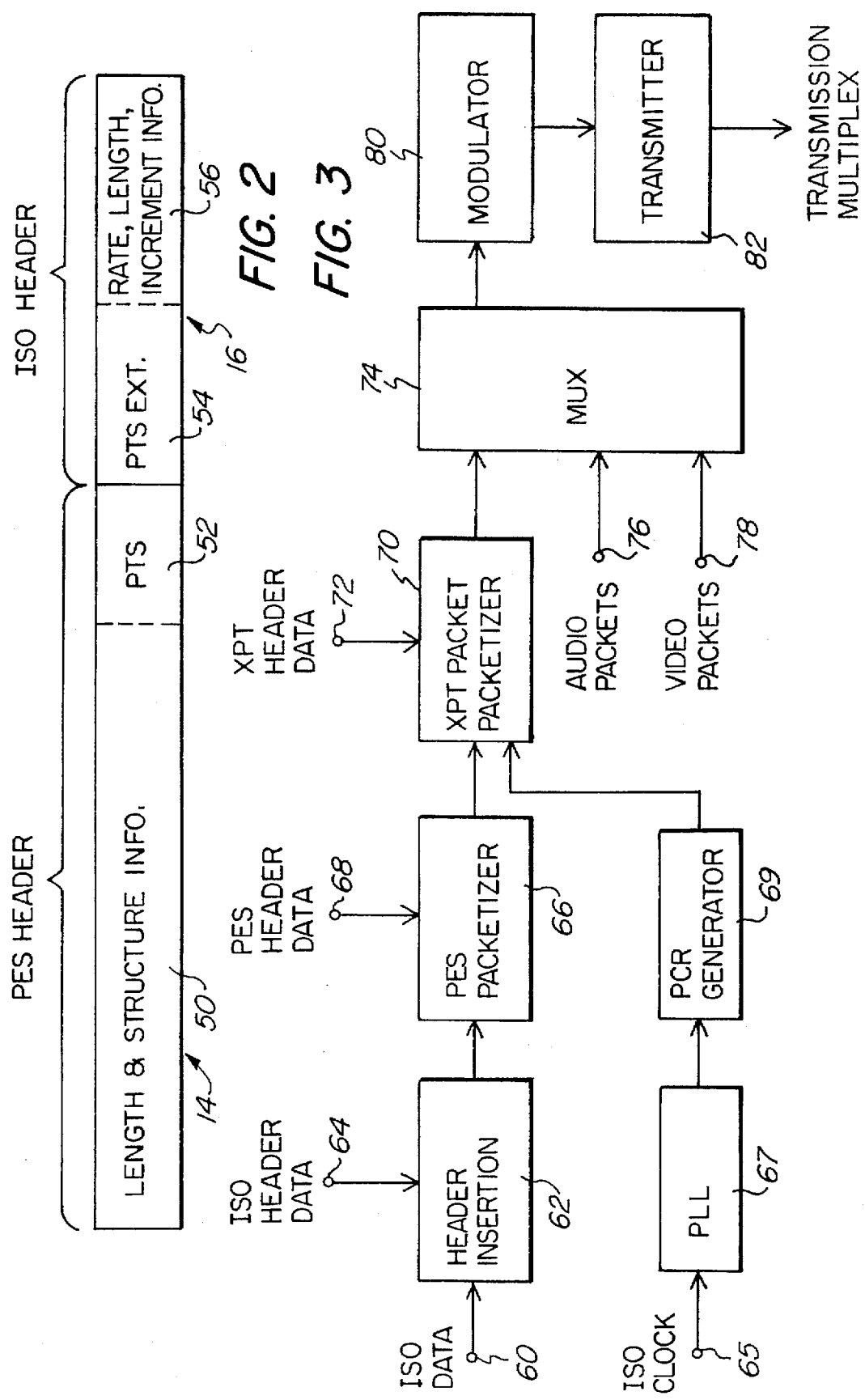

5,742,623

ERROR DETECTION AND RECOVERY FOR HIGH RATE ISOCHRONOUS DATA IN MPEG-2 DATA STREAMS

This application claims the benefit of U.S. provisional application Ser. No. 60/017,467, filed May 10, 1996, and is a continuation-in-part of, commonly assigned U.S. patent application Ser. No. 08/511,266 filed on Aug. 4, 1995, now U.S. Pat. No. 5,598,415, which was a §111(a) application based on copending U.S. provisional application Ser. No. 60/015,392, filed on Jul. 13, 1995.

BACKGROUND OF THE INVENTION

The present invention relates to a method and apparatus for communicating data via a packetized data stream, and more particularly to the detection of and recovery from errors in high rate isochronous data ("isodata") in a digital data stream. Such a data streams can comprise, for example, an MPEG-2 or DigiCipher® II data stream.

Various standards have emerged for the transport of digital data, such as digital television data. Examples of such standards include the Motion Picture Experts Group standard referred to as MPEG-2 and the DigiCipher II standard proprietary to General Instrument Corporation of Chicago, Ill., USA, the assignee of the present invention. The DigiCipher II standard is similar and inclusive of various aspects of the MPEG-2 standard, which is widely known and recognized as a video and audio compression specification sanctioned by the International Standards Organization (ISO) in Document ISO 13818. In addition to the video and audio compression features, the MPEG-2 specification also contains a systems "layer" that provides a transmission medium independent coding technique to build bitstreams containing one or more MPEG programs. The MPEG coding technique uses a formal grammar ("syntax") and a set of semantic rules for the construction of bitstreams to be transmitted. The syntax and semantic rules include provisions for multiplexing, clock recovery, synchronization and error resiliency. For purposes of this disclosure, any data stream that is coded similarly to that of an MPEG-2 transport stream is referred to as an "MPEG-2 type transport stream." One example, but by no means the only such MPEG-2 type transport stream, is a data stream provided in accordance with the DigiCipher II standard. Other such standards are expected to be promulgated in the future.

The MPEG-2 transport stream is designed with consideration for transmission in conditions that can generate data errors. MPEG transport packets each have a fixed length of 188 bytes. Many programs, each with different components, may be combined in a transport stream. Examples of services that can be provided using the MPEG format are television services broadcast over terrestrial, cable television and satellite networks as well as interactive telephony-based services. The syntax and semantics of the MPEG-2 transport stream are defined in the international Organisation for Standardisation, ISO/IEC 13818-1, International Standard, 13 Nov. 1994 entitled *Generic Coding of Moving Pictures and Associated Audio: Systems*, recommendation H.222.0, and ISO/IEC 13818-2, International Standard, 1995 entitled *Generic Coding of Moving Pictures and Associated Audio: Video*, recommendation H.262, both incorporated herein by reference.

Multiplexing according to the MPEG-2 standard is accomplished by packaging raw elementary streams such as coded video and audio into packetized elementary stream (PES) packets which are then inserted into transport packets.

As noted above, each MPEG transport packet is fixed at 188 bytes in length. The first byte is a synchronization byte having a unique eight-bit pattern, e.g., 01000111. The sync byte indicates the beginning of each transport packet.

Following the sync byte is a three-byte prefix which includes a one-bit transport packet error indicator, a one-bit payload unit start indicator, a one-bit transport priority indicator, a 13-bit packet identifier (PID), a two-bit transport scrambling control, a two-bit adaptation field control, and a four-bit continuity counter. Use of the sync byte and three-byte prefix leaves up to 184 bytes of payload which carry the data to be communicated. An optional adaptation field may follow the prefix for carrying both MPEG related and private information of relevance to a given transport stream or the elementary stream carried within a given transport packet. Provisions for clock recovery, such as a program clock reference (PCR) and splicing control are typical of the information carried in the adaptation field. By placing such information in an adaptation field, it becomes encapsulated with its associated data to facilitate remultiplexing and network routing operations. When an adaptation field is used, the payload is correspondingly shorter.

The PCR is a count which reflects the value of the system time clock (STC) for the associated program at the-time the PCR value was inserted into the transport stream. The decoder uses the PCR to synchronize a decoder time clock with the encoder system clock. The lower nine bits of the 42-bit PCR provide a modulo-300 counter that is incremented at a 27 MHz clock rate (the "system clock rate"). At each modulo-300 rollover, the count in the upper 33 bits is incremented, such that the upper bits represent counts that occur at a 90 kHz rate. This enables presentation time-stamps (PTS) and decoding time-stamps (DTS) to be compared using the 90 kHz value. Since each program or service carried by the data stream may have its own PCR, the programs and services can be multiplexed asynchronously.

Synchronization of audio, video and data within a program is accomplished using a time stamp approach. Presentation time-stamps and decoding time-stamps are inserted into the transport stream for the separate video and audio packets. The PTS and DTS information is used by the decoder to determine when to decode and display a picture and when to play an audio segment. As indicated above, the PTS and DTS values are tied to the same clock established by the PCRs, but are limited by the MPEG-2 standard to a time resolution of 11.1 microseconds. This resolution is limited by the PTS resolution of 90 kHz ticks, provided by the upper 33 bits of the PCR. This limitation precludes the transport of generalized "high rate" data which is robust to timing errors, e.g., data rates not integer related to 90 kbps, using the same approach provided for video and audio information in a standard MPEG-2 type transport stream.

MPEG-2 data, such as compressed video and audio data, must be formatted into a packetized elementary stream (PES) formed from a succession of PES packets. Each PES packet includes a PES header followed by a payload. The PES packets are then divided into the payloads of successive fixed length transport packets.

PES packets are generally of variable and relatively long length. Various optional fields, such as the presentation time-stamps and decoding time-stamps may follow the PES header. When the transport packets are formed from the PES, the PES headers are aligned with the transport packet headers. A single PES packet may span many transport packets and the subsections of the PES packet must appear in consecutive transport packets of the same PID value. It should be appreciated, however, that these transport packets may be freely interleaved with other transport packets having different PIDs and carrying data from different elementary streams.

Video services are carried by placing coded MPEG video streams into PES packets which are then divided into transport packets for insertion into a transport stream. Each video PES packet contains all or part of a coded video picture, referred to as a "video presentation unit." PTS and DTS data are placed into the PES packet header that encapsulates the associated presentation unit. The DTS indicates when the decoder should decode the presentation unit. The PTS is used to actuate the decoder to present (e.g., "display") the associated presentation unit.

Audio services are provided in accordance with the MPEG standard using the same specification of the PES packet layer. PTS data is attached to some packets that include audio frame boundaries. Such boundaries are defined by audio synchronization (sync) words. An audio frame is defined as the data between two consecutive audio sync words.

In order to reconstruct a television signal from the video and audio information carried in an MPEG-2 type (e.g., MPEG-2 or DigiCipher II) transport stream, a decoder is required to process the video packets for output to a video decompression processor (VDP) and the audio packets for output to an audio decompression processor (ADP). It is also possible to transmit other types of data in such a transport stream. For example, private data to provide services such as teletext, stock quotes and other information can be carried as separate transport packets derived from a separate packetized elementary stream. Asynchronous data pipes can be supported as well; such a pipe would represent an RS-232 style output from the decoder with the equivalent input to an encoder. Such information service transport packets would be multiplexed with the MPEG video and audio packets in a final multiplex transmitted, e.g., via satellite or cable.

It would be advantageous to also carry "isochronous" data using an MPEG-2 type format. Isochronous data is high rate data provided at the edges of a regular clock and is distinguished from bursty "synchronous" data which may arrive with an irregular clock. Thus, isochronous data carries a jitter specification and the clock can be restored with a simple phase lock loop (PLL). In general, an isochronous data component is one in which data bits are presented at essentially regular rates, with an accompanying clock. Any deviation from the regular (isochronous) rate would be defined by the jitter specification. Such data may be used for any number of a large range of "data pipe" applications. One example is the transport of the contents of a T1 digital (i.e., telephone data line) data stream. Such data streams operate at 1.554 Mbps. Other applications include, but are not limited to, business network data, general high speed data communications, and virtually any other data service requiring constant delay data transmission rates that exceed those generally available using asynchronous communication techniques or are not appropriate for variable delay. These applications are characterized by a general intolerance of "bit slips." That is, errors are tolerated, but resynchronization involving net shifts of the bitstream cause large outages to the ultimate data synchronization.

In the MPEG-2 standard, the presentation time-stamps are only able to indicate presentation unit instances(i.e. 8-bit bytes of data "presented" to the decoder) with a resolution of 11.1 microseconds. This limitation results from the 90 kHz rate established by the upper bits of the PCR count used to produce the presentation time-stamps. With high speed isochronous data, it may be necessary to resolve presentation unit times with a higher resolution, especially for purposes of error recovery. Specifically, it is necessary to be capable of presenting presentation units unambiguously in time to support continuously variable rates. Therefore, it would be advantageous to increase the time resolution of the presentation time-stamps over that provided by a standard MPEG-2 implementation. For example, it would be advantageous to provide a scheme for increasing the PTS time resolution to allow the robust transport of isochronous data or the like at rates up to 9.0 Mbps or more.

It would be further advantageous to provide a scheme for simplifying a data receiver to provide the appropriate clock rates based on a system clock frequency, in order to recover data from a data stream. In particular, it would be advantageous to provide a scheme in which the receiver would be able to provide a clock at any desired information data rate from, e.g., 19.2 kbps to 9 Mbps for use in outputting isochronous information data, via direct digital synthesis (DDS).

It would be still further advantageous to provide a method and apparatus for managing the inevitable errors that occur in the transmission of isochronous data via a packetized transport stream. In particular, it would be desirable to maintain synchronization of incoming isodata despite the occurrence of errors and during the time that error recovery is underway. Moreover, isodata will typically flow through a buffer in a decoder that recovers the isodata from the transmission stream. It would be advantageous to maintain the fullness of the buffer during error recovery to avoid the failure of the data recovery process due to a buffer overflow or underflow.

After data are lost due to errors, it would be advantageous to have a mechanism to check and restore the timing at which the successfully recovered isodata is presented as output from the isodata decoder, and to absorb timing errors caused by lost data. Improved methods for detecting the occurrence of lost data would also be desirable. Additional provisions for ensuring the resumption of data presentation at the correct output time would also be advantageous. Still further, it would be advantageous to provide a scheme for overcoming uncertainties in the contents of data packets in the event that the packets contain encrypted data after any decryption thereof should have already been completed.

The present invention provides methods and apparatus for detecting and recovering from errors in the processing of isodata at a decoder, which methods and apparatus enjoy the aforementioned and other advantages.

SUMMARY OF THE INVENTION

In accordance with the present invention, a method is provided for managing errors in isochronous data received in bursts from a packetized data stream carrying isodata presentation units in fixed length isodata transport packets. Each of the transport packets includes a packet identifier (PID). At least some of the packets contain a presentation time stamp (PTS) indicative of a time for commencing the fixed rate presentation of isodata presentation units from a buffer into which they are temporarily stored upon receipt. The data stream is monitored to detect PIDs identifying the isodata transport packets. The isodata transport packets identified by said PIDs are monitored to locate isodata PTSs. The presentation of said presentation units from said buffer is synchronized to a system time clock (STC) using timing information derived from the located isodata PTSs. Discontinuity errors are identified between successive ones of said isodata transport packets and, if a discontinuity of no more than one packet is identified, a write pointer of said buffer is advanced by a suitable number of bits to compensate for the discontinuity, while the synchronization of said presentation with respect to said STC is maintained.

First and second PTS pointers are provided, each for maintaining a different PTS value and address of the buffer to identify where a presentation unit referred to by the PTS value is stored. The synchronization of said presentation is maintained by (i) replacing the PTS value and address for one of the PTS pointers with a new PTS value and new address after data stored at the address associated with the replaced value has been presented from said buffer, (ii) when the new address is reached, suspending the presentation of data from the buffer if the STC is not equal to a presentation time derived from said new PTS value, and (iii) if the presentation has been suspended, recommencing the presentation of data from the buffer when the STC reaches the presentation time derived from the new PTS value.

New PTS values may be received over time from the isodata transport packets. In such an embodiment, a determination is made if both of the PTS pointers contain PTS values that have not yet been used to present data from said buffer when a new PTS value is received. If so, the PTS value and associated address in the most recently updated PTS pointer is replaced with the new PTS value and new address, thereby maintaining the oldest unused PTS value and address for use in synchronizing the presentation of the presentation units from said buffer.

In another embodiment, a PTS pointer is provided to maintain a current PTS value together with an address of said buffer identifying where a presentation unit referred to by said current PTS value is stored. The synchronization of the presentation is maintained by the further steps of (i) replacing the PTS value in the PTS pointer with a new current PTS value after data stored at said address has been presented from said buffer, (ii) replacing said address in the PTS pointer with a new address corresponding to a presentation unit referred to by the new current PTS value, (iii) when said new address is reached, suspending the presentation of data from said buffer if said STC is not equal to a presentation time derived from said new current PTS value, and (iv) if the presentation has been suspended, recommencing the presentation of data from said buffer when the STC reaches the presentation time derived from said new current PTS value.

The presentation units carried by the packetized data stream may be supplied by packetized elementary stream (PES) packets carrying the presentation units together with information indicative of the length of each PES packet. In such an embodiment, a determination is made as to whether an amount of presentation unit data actually received for a given PES packet differs from an amount of data that should be received as indicated by the PES packet length information. An error is indicated if the compared amounts of data do not match.

In the event of such an error, the PTS pointer is cleared. The presentation of data from the buffer is also temporarily stalled should additional presentation unit data continue to arrive in the absence of a new PES packet indicator after the PES packet length information indicates that all data has been provided for the given PES packet. The presentation of data from the buffer will recommence, based on a new PTS value provided in the PTS pointer, after the PTS pointer has been cleared.

A PTS extension may be retrieved from the identified isodata transport packets to enable the time resolution for presenting isodata presentation units to be increased. In this instance, the timing information can be determined by summing at least said PTS and said PTS extension. The timing information may alternatively be derived from the sum of said PTS, said PTS extension, and a PTS offset value used to provide a time delay.

The timing information can be compared to the STC to determine whether the presentation units are too early to be presented, too late to be presented, or ready to be presented from the buffer. Fill bits are provided as output until it is time to present the presentation units if the comparison determines that the presentation units are too early to be presented. The presentation of presentation units from the buffer is resynchronized if the comparing step determines that the presentation units will be presented too late. The presentation units are presented from the buffer if the comparing step determines that they are ready to be presented.

The synchronization of the presentation of the presentation units to the system time clock can be effected by comparing the STC to the timing information derived from the PTSs. Fill bits can then be provided as output until it is time to present said presentation units if said comparison determines that said presentation units are too early to be presented. As indicated above, the timing information can comprise the sum of at least a PTS and a PTS extension that enables the time resolution for presenting isodata presentation units to be increased. The fill bits are provided as output until a-time designated by the STC equals the time designated by said sum. Alternatively, the timing information can comprise the sum of said PTS, said PTS extension, and a PTS offset value used to provide a time delay.

Each presentation unit can comprise an integer number N bits of isodata. An N-bit count is maintained that is correlated with the presentation of a first presentation unit from the buffer. Fill bits are continually provided as output after the STC equals the time designated by said sum until the N-bit count indicates that it is time to commence the presentation of a new presentation unit.

The isodata transport packets identified by the PIDs can be monitored to determine if any of them are designated as being encrypted after any encryption should have been removed. If only a single packet is designated as being encrypted after any encryption should have been removed, a write pointer of the buffer is advanced by a suitable number of bits to ignore the single packet. The synchronization of said presentation is maintained with respect to the STC during this procedure.

A decoder is provided for receiving and managing errors in isochronous data received in bursts from a packetized data stream carrying isodata presentation units in fixed length isodata transport packets. Each of the transport packets includes a packet identifier (PID) and at least some of the packets contain a presentation time stamp (PTS) indicative of a time for commencing the fixed rate presentation of isodata presentation units from a buffer into which they are temporarily stored upon receipt. Means are provided for monitoring the data stream to detect PIDs identifying said isodata transport packets. Means are also provided for monitoring the isodata transport packets identified by said PIDs to locate isodata PTSs. The presentation of said presentation units from said buffer is synchronized to a system time clock (STC) using timing information derived from the located isodata PTSs. Means are provided for identifying discontinuity errors between successive ones of said isodata transport packets and, if a discontinuity of no more than one packet is identified, a write pointer of said buffer is advanced by a suitable number of bits to compensate for the discontinuity, while maintaining the synchronization of said presentation with respect to said STC.

The decoder may also incorporate the other error management features of the methods described above.

BRIEF DESCRIPTION OF THE DRAWINGS

FIG. 2 illustrates the PES and isochronous data headers referred to in FIG. 1 in greater detail;

FIG. 3 is a block diagram of encoder apparatus for assembling the transport packets referred to in FIG. 1;

DETAILED DESCRIPTION OF THE INVENTION

Figure 1:
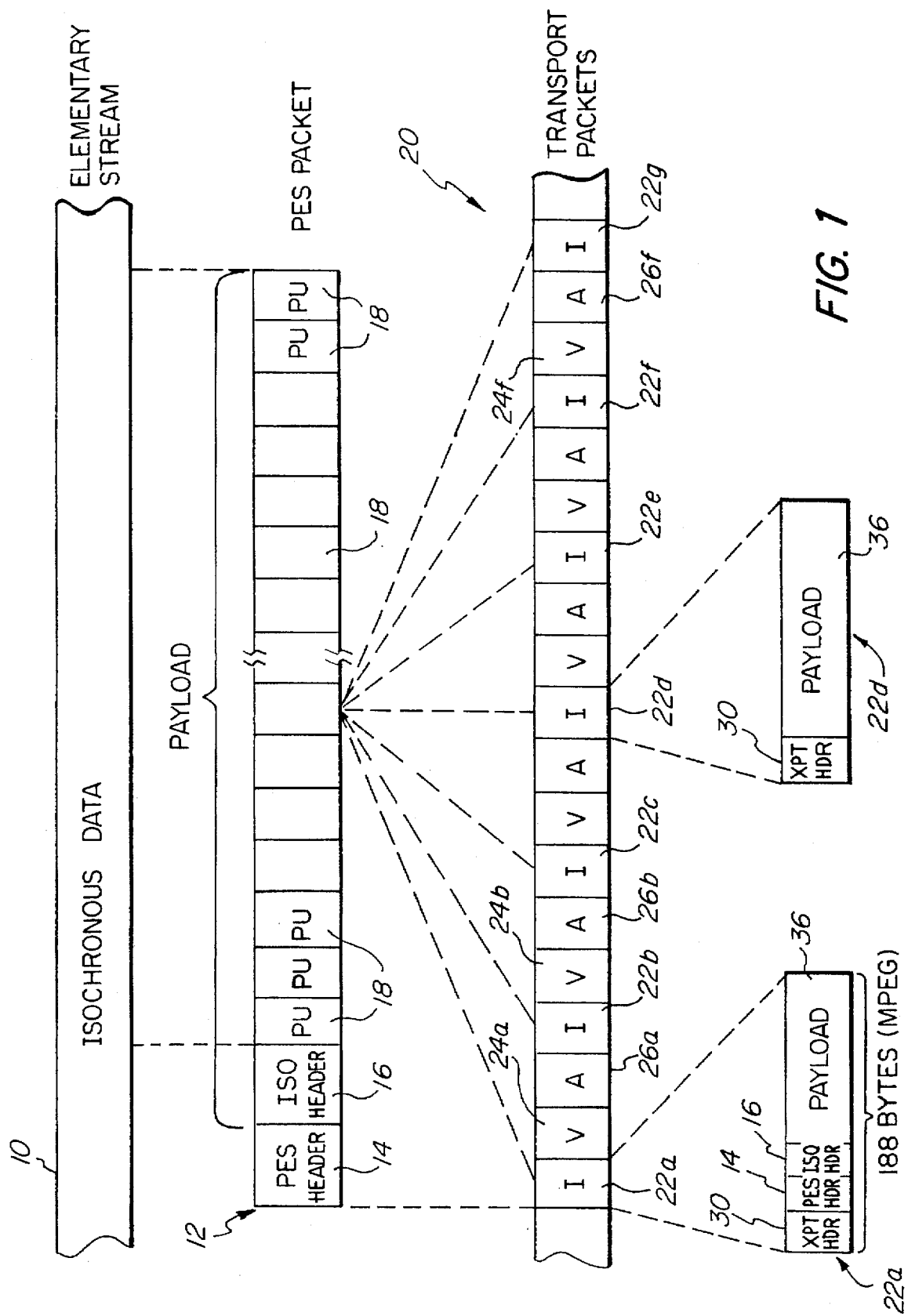
FIG. 1 is a diagrammatic illustration showing how elementary stream data is packaged into transport packets.

FIG. 1 is a diagrammatic illustration showing how different digital service components can be multiplexed into a stream of transport packets. Multiplexing is accomplished by packaging raw elementary streams such as coded video, audio and data into PES packets and then encapsulating these into transport packets. The figure is illustrative only, since a PES packet, such as packet 12 illustrated, may translate into more or less than the seven transport packets 22a–22g illustrated.

In the example of FIG. 1, an elementary stream generally designated 10 comprises a serial stream of data bits, such as the isochronous data shown. It should be appreciated that other types of data can be provided in the elementary stream for transmission in accordance with the present invention. Similar elementary streams will be provided for compressed video and audio data in accordance with the MPEG-2 transport standard.

The first step in forming a transport packet stream is to encapsulate the elementary stream for each type of data into a corresponding packetized elementary stream (PES) formed from successive PES packets, such as packet 12 illustrated. Each PES packet contains a PES header 14 followed by a PES payload containing an integer number of presentation units (PU) 18. The payload comprises the ultimate information that is desired to be communicated from a transmission site for recovery at a receiving site. The PES header 14 contains information useful in processing the payload data, such as the presentation time-stamp (PTS) in accordance with the MPEG-2 systems specification.

In accordance with the present invention, an isochronous data header (ISO header) 16 follows the PES header 14 as part of the PES packet payload. The presentation units 18 of the payload follow the ISO header 16. The ISO header is described in greater detail below.

The header and payload data from each PES packet is split into individual fixed length transport packets 22, 24, 26, each containing a transport header 30 and payload data 36.

The payload data of each transport packet will contain a portion of the payload data (i.e., presentation units 18) of the corresponding PES packet 12 and may also contain the PES header 14 and ISO header 16, as illustrated at 22a. Transport packet 22d is another isochronous data transport packet in the transport packet multiplex 20. This transport packet includes a transport header 30 as well as payload 36. The payload does not include a PES header or ISO header because this transport packet is derived from payload data that is subsequent to the PES header and ISO header in the PES packet. In other words, since there is only one PES header and one ISO header per PES packet, only the first transport packet derived from that PES packet will contain the PES header and ISO header. The payload segments of the remaining transport packets derived from the PES packet will contain only portions of the actual information data to be transmitted.

In accordance with the MPEG-2 systems specification, the transport packet headers 30 will contain the program identifier (PID) which distinguishes each transport packet stream, such as an isochronous data packet stream, a video packet stream, or an audio packet stream, from other packet streams. In FIG. 1, only the derivation of the isochronous data transport packets 22 is shown. In order to derive video packets 24 and audio packets 26, corresponding elementary streams (not show n) are provided which are encapsulated into PES packets and transport packets in essentially the same manner illustrated in FIG. 1 with respect to the formation of the isochronous data packets 22, except that the isochronous data header 16 of the present invention is not provided in the video or audio transport packets.

Each MPEG transport packet contains 188 bytes of data, formed from the transport header 30 of at least four bytes and payload data 36, which can be up to 184 bytes. In accordance with the MPEG-2 systems specification, an adaptation field of, e.g., eight bytes may be provided between the transport header 30 and payload 36. The variable length adaptation field can contain, for example, the program clock reference (PCR) used for synchronization of the decoder's system time clock.

The plurality of isochronous data packets 22a, 22b, 22c . . . 22g . . . , and other packets 24a–f . . . and 26a–f . . . is multiplexed as illustrated in FIG. 1 to form the transport stream 20 that is communicated over the communication channel from the encoder to the decoder. The purpose of the decoder is to demultiplex the different types of transport packets from the transport stream, based on the PIDs of the individual packets, and to then selectively process each of the isochronous data, audio and video components for use in reconstructing a television signal and recovering a data stream represented by the isochronous data.

FIG. 2 illustrates the PES header 14 and ISO header 16 in greater detail. The PES header 14 includes various length and structure information 50 in accordance with the MPEG-2 systems specification. An optional PTS field 52 may follow the length and structure information 50. In the event a PTS is provided, a counterpart PTS extension is provided in the ISO header 16. As illustrated in FIG. 2, the PTS extension 54 is preferably provided at the beginning of the ISO header 16 such that it immediately follows the PTS B2 in the PES header. The present invention is not limited, however, to providing the PTS extension at the beginning of the ISO header. The PTS extension can be provided elsewhere in the ISO header, as long as it can be detected at the decoder for use in appending it to the PTS to extend the time resolution for presenting the isochronous data at the output of the decoder. By providing an additional eight bits, for example, in the PTS extension to be added to the thirty-three bits provided in the PTS specified in MPEG's systems specification, the standard MPEG-2 resolution of 11.1 microseconds can be extended to 74 nanoseconds for unambiguous determination of the correct presentation unit start time referenced by an extended isochronous data PTS.

The ISO header also includes various rate, length and increment information 56. More particularly, the rate, length and increment information will include a data rate flag, an isochronous data header length field, and an increment field specifying a ratio of the information data rate (e.g., the isochronous data rate) to a system clock frequency. This clock increment value enables a direct digital synthesis clock at a decoder to provide a clock signal at the information data rate for use in outputting information data carried by a data transport stream in accordance with the present invention.

In a preferred embodiment of the invention, each isochronous data presentation unit 18 (FIG. 1) is sixteen bits in length, i.e., one word of two eight-bit bytes. The isochronous data is aligned with the PES syntax in that the first byte of the isochronous data header immediately follows the last byte of the PES header. Also, the isochronous data presentation units are aligned with the PES syntax in that the first byte of the first presentation unit in a given PES packet immediately follows the last byte of the isochronous data header.

Isochronous data presentation units are aligned with transport packet payloads such that the first payload byte of an isochronous data transport packet is the first byte of an isochronous data presentation unit (following any adaptation, PES header and isochronous data header fields). The last byte of an isochronous data transport packet is the last byte of an isochronous data presentation unit.

The syntax of isochronous data in accordance with the present invention is described below using the formal grammar utilized by the MPEG-2 systems specification. The MPEG grammar is a C-language-like syntax and is a method of describing continuous and possibly variable rate sequences of bits, instead of specifying a procedural program and its functions as in the computer language C. The first column of the syntax contains the syntax element. The second column gives the length of the syntax element in bits and the third column identifies the syntax type. The types are bslbf (bit sequence left-most bit first) and uimsbf (unsigned integer most significant bit first). The notation "isochronous_data_header() { . . . }" indicates that the syntax elements within the braces are a named set and may be invoked elsewhere in the syntax by simply using the designation "isochronous_data_header()". A conditional occurrence of bit structures may be indicated with the usual "if" tests. The customary relational operators well known in the C-language are also available. Loop structures are possible and use the standard C loop syntax. The syntax table is accompanied by a set of semantics, providing definitions for each previously undefined syntax fields and placing constraints on their use. The following isochronous data bitstream syntax and bitstream semantics represent a preferred embodiment of the present invention:

| Isochronous Data Sequence: | | |
|---|---|---|
| Syntax: | No. of Bits: | Mnemonic: |
| isochronous_data_sequence{ | | |
|   Isochronous_data_header(){ | | |
|     for (i=0; i<N; i++){ | | |
|       Isochronous_data_presentation_unit | 16 | bslbf |
|     } | | |
|   } | | |

Isochronous Data Header
To constrain each isochronous data sequence to an even number of bytes, the last reserved field in the isochronous data header is specified to be an even number of bytes. The syntax for isochronous data headers is:

| Syntax: | No. of Bits: | Mnemonic: |
|---|---|---|
| isochronous_data_header{ | | |
|   pts_ext8 | 8 | bslbf |
|   data_rate_flag | 1 | bslbf |
|   reserved | 3 | bslbf |
|   isochronous_data_header_length | 4 | uimsbf |
|   if(data_rate_flag){ | | |
|     reserved | 4 | bslbf |
|     increment | 28 | uimsbf |
|   } | | |
|   reserved | n | bslbf |
| } | | |

Isochronous Data Bitstream Semantics
Isochronous Data Sequence
Isochronous_data_presentation_unit
A 16 bit presentation unit of isochronous data where the first (left) bit is presented (output) before the second bit, etc.
Isochronous Data Header
pts_ext8
An 8-bit field extending the PTS conveyed in the PES header of this PES. This field is the 8 most significant bits of the 9 bit PCR extension defined in the MPEG-2 systems specification, and is used in accordance with the present invention to extend the time resolution of isochronous data PTSs from the MPEG-2 systems specification resolution of 11.1 microseconds (90 kHz) to 74 nanoseconds (13.5 MHz) for unambiguous determination of the correct presentation unit start time referenced by an isochronous data PTS.
data_rate_flag
A one bit flag which, when set to
"1", indicates that an increment field is present in the isochronous data header.
isochronous_data_header_length
A 4 bit field indicating the number of words (16 bits) of isochronous data header which follow this field including the reserved words, (units of 16 bits forces the isochronous data header to be an even number of bytes which, coupled with isochronous data presentation units, adaptation fields, and PES header also being an even number of bytes, allows isochronous data transport packets to be generated without any padding bytes and thus higher efficiency).
increment
A 28 bit field which indicates the isochronous data clock increment value and takes on a value that describes the exact ratio of the isochronous data rate to a phase locked reference clock. e.g., an MPEG-2 27 MHz reference. In a preferred embodiment, increment is:

increment=NINT(isochronous data rate *536,868,000/ nominal_system_clock_frequency); where:

nominal_system_clock_frequency is specified by MPEG as 27 MHz and "NINT" means "nearest integer." As noted above, MPEG allows a 30 PPM variability from the nominal system clock frequency.

reserved

An n-bit field of reserved words of which the decoder assumes no particular value.

The block diagram of FIG. 3 illustrates a possible encoder for implementing the present invention. Isochronous data (e.g., from elementary stream 10—FIG. 1) is input via terminal 60 to a header insertion stage 62 which inserts the data required to assemble the ISO header 16. This data is obtained, for example, from a system microprocessor, not shown. The isodata with the inserted ISO header is received by a PES packetizer stage 66 that inserts the PES header 14 which has been assembled from PES header data input via terminal 68. As with the ISO header data, the PES header data can be obtained from a system microprocessor or other data source as well known in the art.

An isochronous data clock signal is input via terminal 65 to a phase lock loop (PLL) 67 of the encoder of FIG. 3. The PLL can comprise, e.g., a 27 MHz oscillator and DDS circuit to lock to the input clock signal, using the nearest increment value as calculated above. PCR values are then generated by a PCR generator 69. The PCR values are input as transport adaptation data to a transport packet packetizer 70, described in further detail below.

Once the ISO header and PES header have been inserted into the isochronous data elementary stream, the subsequent payload data input via terminal 60 is segmented to follow the headers in the form of fixed length presentation units 18. The result is a succession of PES packets 12 which are output from PES packetizer 66 to the transport packet packetizer stage 70. At this point, data necessary to assemble the transport header is received via terminal 72 in a conventional manner and assembled into a transport header, to which counterpart payload data is appended. The payload data comprises the next portion of data (i.e., PES header data, ISO header data and/or presentation units) from the current PES packet(s). The output of packetizer 70 is a series of isochronous data transport packets 22 which will each comprise a transport header and payload and may or may not include PES header and isochronous data header information as part of the payload.

The isochronous data transport packets from packetizer 70 may be multiplexed with compressed audio packets and video packets input to a multiplexer 74 via terminals 76 and 78, respectively. The audio and video packets are provided in accordance with the MPEG-2 systems specification, as well known in the art. Multiplexer 74 assembles the transport packets into a transport packet stream 20 (as shown in FIG. 1). The transport packet stream is modulated in a conventional modulator 80 and transmitted by a conventional transmitter 82 via a satellite, cable or other known communication channel.

Figure 4:
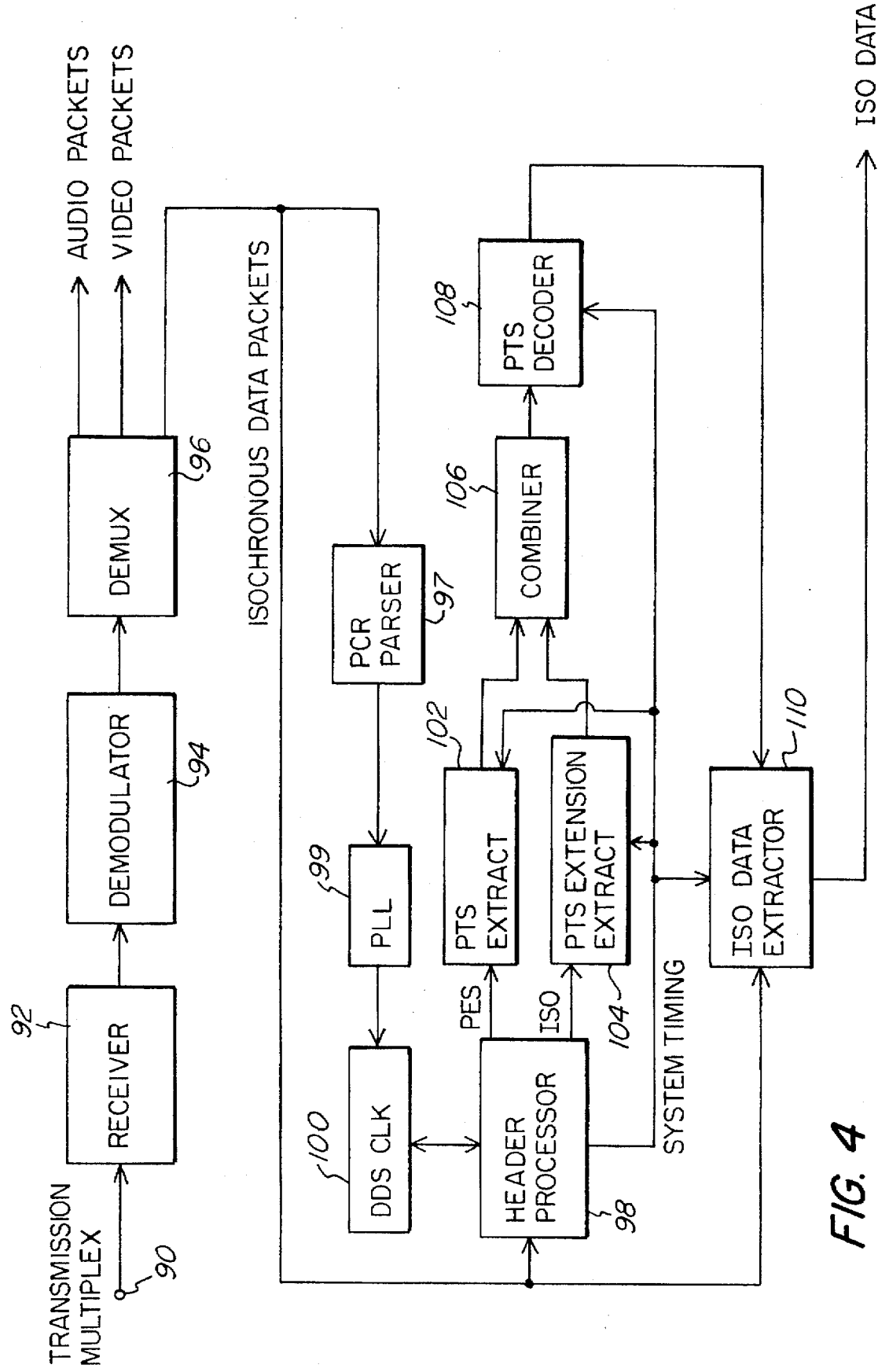
FIG. 4 is a block diagram of decoder apparatus for recovering the isochronous data carried by the transport packets.

FIG. 4 illustrates a receiver ("decoder") for the transmission multiplex output from the encoder of FIG. 3. The transmission multiplex is input to a receiver 92 via terminal 90, and demodulated in a conventional demodulator 94. A demultiplexer 96 recovers the audio packets, video packets and isochronous data packets from the demodulated transport packet stream. The isochronous data packets are input to a header processor 98 which can comprise a conventional microprocessor programmed to recover the PES header and ISO header from the isochronous data packet stream. The PTS is extracted from the PES header in a PTS extraction stage 102. The PTS extension is extracted from the ISO header by a PTS extension extraction stage 104. The PTS and PTS extension are combined in a combiner 106 to provide the isochronous data PTSs that enable the high rate isochronous data to be accurately presented in time. A PTS decoder 108 extracts the timing information from the extended isochronous data PTSs output from combiner 106. This timing information is input to an isochronous data extractor 110 that also receives the isochronous data packets from demultiplexer 96. System timing information from the header processor 98 enables the extraction stages 102, 104, the PTS decoder 108 and the isochronous data extractor 110 to properly locate and process the data presented to each stage. The isodata extractor 110 responds to the PTSs from PTS decoder 108 in order to present the individual isochronous data presentation units (the recovered "isodata") at the appropriate time. The presented isodata is output from isodata extractor 110 for use in providing a desired service based on the information embodied in the data.

The decoder of FIG. 4 also includes a DDS clock 100 that is used to provide a plurality of reference clock rates used by the header processor and/or other components of the decoder. The system timing output from header processor 98 is based on one or more of the reference clock rates provided by the DDS clock. These reference clock rates are based on a system clock frequency, for example, the 27 MHz system clock frequency set forth in the MPEG-2 systems specification. In order to process PCRs to generate the system clock frequency for use by the DDS, the decoder includes a PCR parser 97 that extracts PCR values from isochronous data transport packets. The extracted PCR values are used to lock a phase lock loop 99 that generates the system clock (e.g., 27 MHz). The system clock is input to the DDS clock 100 for use in generating the reference clock rates described above.

In order to simplify the decoder, a clock "increment" is provided in the isochronous data header to specify the ratio of the isochronous data rate to the system clock frequency. This increment is recovered by the header processor 98 and input to the DDS clock 100, which uses the increment to provide a clock signal at the isochronous data rate for use in presenting the isochronous data.

The provision of a clock increment in the isochronous data header obviates the need for the decoder to have to compute this increment on its own. In conventional systems using a direct digital synthesis clock, the decoder receives a required clock frequency indicator with the data to be recovered. The clock frequency indicator specifies the actual clock frequency that is to be synthesized by the DDS clock. Since the DDS clock scales an existing system clock in order to produce various fixed clock frequencies, conventional decoders must first determine the ratio of the desired clock frequency to the system clock frequency from which the desired clock frequency is to be derived. The processing hardware necessary to perform this function adds cost and complexity to the decoder.

In a digital television decoder, cost must be kept to a minimum since a separate decoder will be required for each of the potentially millions of televisions in the field. By providing the decoder with an increment that can be directly used by the DDS clock to produce the desired frequency, the receiver complexity and cost is reduced. In the system of the present invention, the computation of the increment necessary to provide the desired frequency is done centrally at the encoder, which serves the millions of decoders in the field. The decoders therefore do not need to perform this computation.

Figure 5:
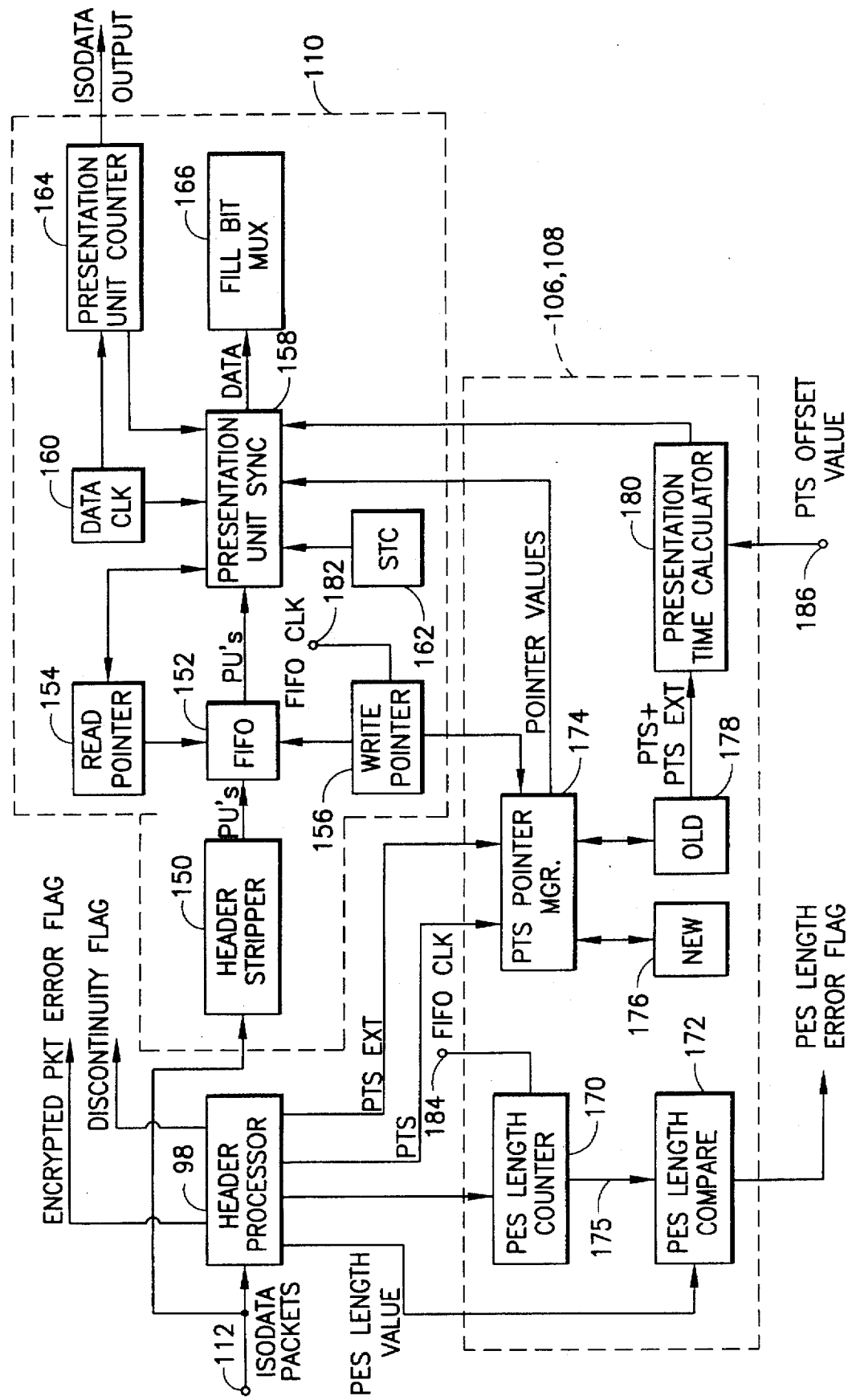
FIG. 5 is a block diagram showing portions of FIG. 4 in greater detail.

FIG. 5 illustrates the combiner 106, PTS decoder 108, and isodata extractor 110 of FIG. 4 in greater detail. Isodata packets, detected by their PIDs in an incoming data stream, are input to header processor 98 and a header stripper 150 via a terminal 112. The header stripper 150 is part of the isodata extractor 110, and strips the transport, PES and isodata headers from the received packets so that just the presentation units (PUs) are provided as output to a first-in first-out register (FIFO) 152. FIFO 152 buffers the PUs in accordance with the invention so that proper synchronization and error recovery can be accomplished. The FIFO may be implemented using a series of FIFOs such as a pre-DRAM FIFO, a DRAM FIFO, and a post-DRAM FIFO. In such an implementation, references herein to reading from the isodata FIFO are referenced to the last FIFO used, e.g., a post-DRAM FIFO. A read pointer 154 and write pointer 156 are provided to control the writing of data to and reading of data from FIFO 152. Write pointer 156 is synchronized to a FIFO clock via terminal 182. A detailed description of the buffer operation is provided below in connection with the description of FIG. 6.

The presentation units from the FIFO 152 are provided as output to a presentation unit synchronization circuit 158. This circuit synchronizes the presentation unit data to the system time clock (STC) 162. A data clock 160, which runs at the fixed rate at which the isodata is ultimately output, is coupled to the presentation unit sync circuit 158 and to a presentation unit counter 164. This arrangement is used to ensure that the presentation of isodata from the FIFO commences at the first bit of a presentation unit. The data presented from the FIFO is input to a fill bit multiplexer (MUX) 166, which is used to provide fill bits when necessary to recover from errors that occur in the input data stream. The output of the fill bit multiplexer 166 comprises the recovered isodata which may include fill bits in place of corrupted or missing data.

The presentation unit sync circuit 158 also receives necessary pointer values and the correct presentation time from PTS decoder 108. In FIG. 5, the functions of PTS decoder 108 are grouped together with the functions of combiner 106. As noted above in connection with FIG. 4, combiner 106 provides the isochronous data PTSs that enable the high rate isochronous data to be accurately presented in time.

Circuits 106 and 108 comprise a PES length counter 170 and a PES length compare circuit for determining if the length of each received PES packet corresponds to the length designated for that packet in the corresponding PES header. The PES length value extracted from the PES header is supplied to the PES length compare circuit 172 by header processor 98. PES length counter 170 receives the FIFO clock via terminal 184, and determines the length of each received PES by counting the bytes contained therein, one byte per FIFO clock cycle. PES length counter 170 receives information designating the beginning of each new PES packet from header processor 98, and in turn supplies the length counted for each PES packet to PES length compare circuit 172 via line 175. In the event that the counted length does not match the PES length indicated in the PES header, a PES length error flag is generated. Other error flags, which are generated by header processor 98, include an encrypted packet error flag and a discontinuity flag. An isochronous data microprocessor (not shown) receives the various error flags and provides control signals for responding to the error conditions. These error flags are discussed in greater detail below.

The function of combining the PTS and PTS extension are provided by a PTS pointer manager 174. PTSs and PTS extensions are carried in certain of the isodata headers detected by header processor 98, which passes these values to the pointer manager. The pointer manager stores the PTS and PTS extension values in new and old pointer registers 176, 178, respectively. The combined oldest value is output to presentation time calculator 180 for use in computing the time at which isodata presentation units are to start being presented from the isodata extractor 110. The write pointer 156 keeps the pointer manager advised as to the most recently written FIFO address, so that the pointer manager can supply the FIFO address value of each PTS pointer.

A PTS offset value is provided to the presentation time calculator 180 via terminal 186. This offset value provides any time delay that is necessary to absorb recoverable transport timing errors. More particularly, the offset enables the FIFO to collect enough data to output a continuous data stream despite the MPEG specification's allowable STC error and a decoder's STC tracking loop transient behavior, and allows the FIFO to accumulate an amount of data necessary to survive the loss of a packet without underflowing.

Figure 6:
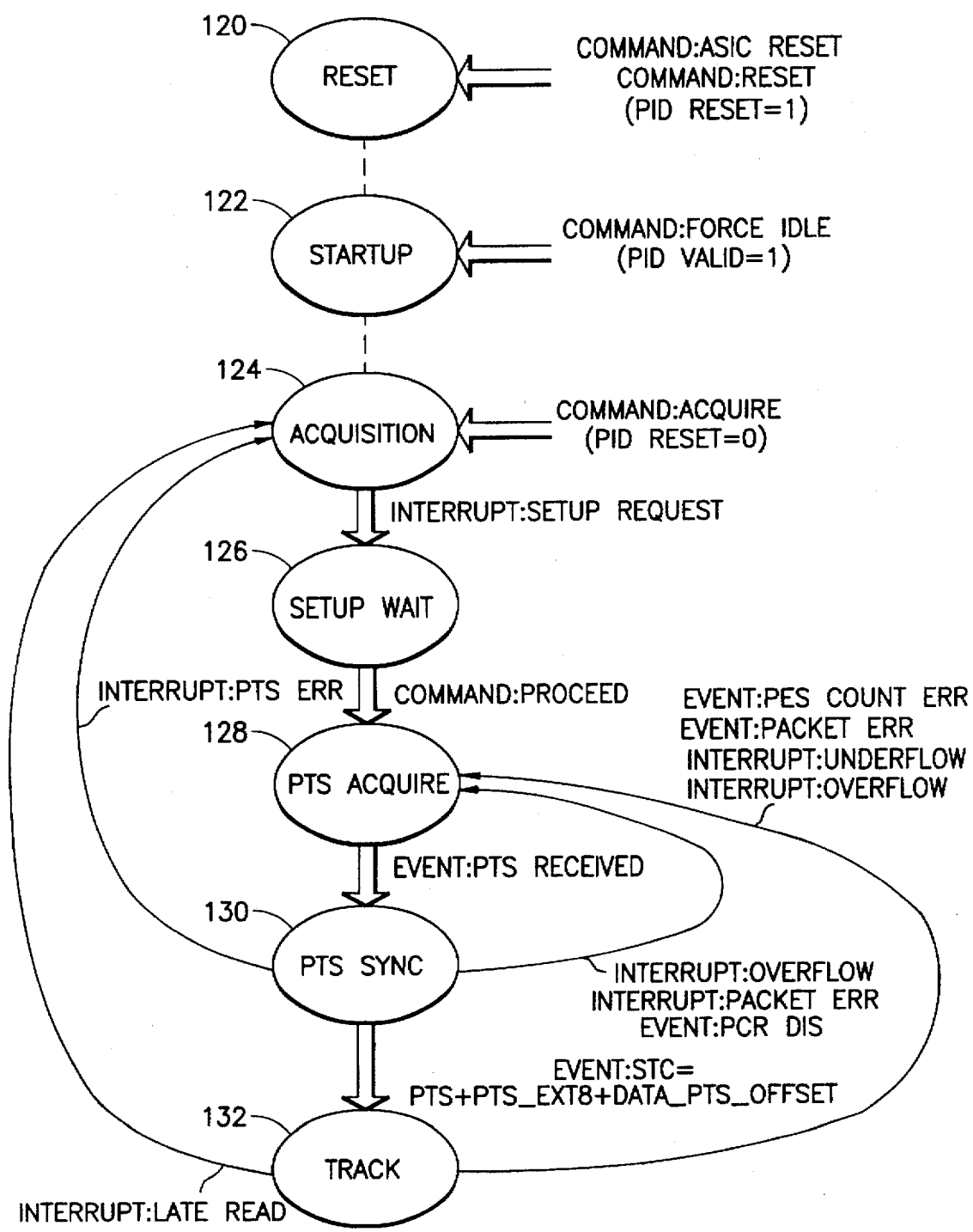
FIG. 6 is a state diagram illustrating the acquisition and tracking of isochronous data in accordance with the present invention.

Turning now to the state diagram of FIG. 6, isodata processing commences at 120 when the system is reset. The isodata output mode is tristated and the isodata PID will be set to invalid at reset. A startup sequence then commences during which the isodata PID is programmed to the PID of the isodata service component before setting the isodata PID to valid. When the isodata PID is written to, the isodata FIFO 152 will be flushed and both PTS pointers 176 and 178 cleared. The FIFO may be flushed by simply setting the read and write pointers 154, 156 to the same address and clearing any pre and post FIFOs. A PTS pointer can be cleared by simply resetting its in-use flag. When the isodata PID is set to valid, the isodata output mode will be set to muted_clock_and_data and acquisition shall begin. In the event the isodata PID returns to the invalid state, the isodata output mode will be set to muted_clock_and_data (if it is not already in this state) and the startup sequence will recommence. If the isodata output mode is set to muted_data, processing of isodata will continue as normal, and the startup state will not necessarily be returned to.

The acquisition state commences at 124 by receiving isodata transport packets on the isodata PID and waiting for a packet with its payload_unit_start_indicator set (indicating that a PES starts with the first byte of the packet's payload). The isodata header will be parsed, to find a data_rate_flag which is set and to find and record the data clock increment value, if present. If the data_rate_flag is set, the increment value will be stored into a register and the system microprocessor will be interrupted to indicate that the increment value has been received on the isodata PID. The process of searching for the increment value in each isodata header will continue until the increment value is received.

Processing will then proceed to the setup wait state 126. At this point, once the increment value is in the register, processing will wait until a register flag is set indicating that isodata acquisition is-to proceed. Acquisition will then continue after the microprocessor has verified that a PCR has been received (e.g., on the isodata PCR PID), has programmed any necessary data modulus and increment registers, and has programmed the data_PTS_offset register. The PTS acquire state 128 is then entered.

In the PTS acquire state, the isodata output mode is set to muted_clock_and_data. Reception of isodata transport packets then resumes, and a search commences for a PES header which contains a PTS. No isodata presentation units are written to the FIFO while in this state.

To aid error detection, each received payload byte on the isodata PID is counted for comparison to the PES length indicated in each PES header. Thus, as each PES start is received, the PES length is stored into PES counter 170. This counter is decremented by one as each PES byte is parsed. When a PTS is received, the PTS value is stored into one of the two PTS pointer registers 176, 178. Parsing of the isodata header (which must exist in this same packet) then proceeds and the pts_ext8 is retrieved and stored with the PTS that was written in the PTS pointer register in the previous step. Processing then proceeds by writing all the presentation units in this packet to the FIFO 152 and also storing the FIFO address at which the first presentation unit is stored. This FIFO address shall be stored with the PTS and pts_ext8 written to the PTS pointer register during the above steps, and then the particular PTS pointer register will be marked as "in-use."

Once a PTS is received with the corresponding isodata presentation unit, the presentation unit synchronizer 158 will begin waiting for PTS sync as shown at 130. This shall consist of keeping the isodata output mode at muted_clock_and_data until the STC 162 equals the value of PTS+pts_ext8+data_PTS_offset supplied by presentation time calculator 180. When this instant occurs, the presentation unit counter 164 (which is a 4 bit counter incremented by the isodata clock 160) is set to the value $8_{10}$ ($1000_2$). This will prepare the presentation unit synchronizer to begin output of the first bit of the presentation unit when the presentation unit counter reaches $0_{10}$ ($0000_2$). This process of setting the presentation unit counter to $8_{10}$ shall only be executed when the acquisition state has been entered since the PTS_Sync state was last entered. Once the presentation unit counter reaches $0_{10}$, the isodata output mode is set to unmuted and presentation of the isodata from FIFO 152 commences beginning with the first bit of the presentation unit at the head of the FIFO. Presentation continues with the FIFO outputting one isodata bit per isodata clock.

If at any time, while waiting for PTS sync, STC is greater than PTS+pts_ext8+data_PTS_offset, processing will be interrupted, the FIFO will be flushed, the PTS pointers will be cleared, and the acquisition state 124 will be recommenced. While waiting for the PTS sync (STC=PTS+pts_ext8+data_PTS_offset), reception and processing of packets shall continue. The presentation units of each packet will be placed into the FIFO, but the isodata header will not. Also, while in this state, when a PTS is received, the PTS value will be stored in the second PTS pointer register along with the pts_ext8 and FIFO address associated with it. If, when a PTS if received, both PTS pointer registers are occupied, the new PTS pointer shall overwrite the PTS pointer most recently written (newest PTS pointer).

Once the output of isodata is commenced, tracking begins as indicated at 132. In this state, data will continue to be presented from the FIFO 152 at the rate of the isodata clock 160. Also, isodata transport packets will continue to be processed, writing each presentation unit into the FIFO, and storing PTS pointers. In the event the isodata FIFO is found to be full when an presentation unit needs to be stored (FIFO overflow), the process will be interrupted, the FIFO flushed, the PTS pointers cleared, and the PTS acquire state 128 will be returned to after setting the isodata output mode to muted data. In the event the isodata FIFO is found to be empty when an presentation unit needs to be output (FIFO underflow), the processing will be interrupted, the FIFO flushed, the PTS pointers cleared, and the PTS acquire state 128 will be returned to after setting the isodata output mode to muted_data.

One field included in each isodata transport packet is a field that contains two transport_scrambling control bits, indicating whether the data in the transport packet is encrypted. When an isodata transport packet is received with its transport_scrambling_control bits set to anything other than not_scrambled, this condition will be treated identically to reception of an isodata transport packet which has its transport_error_indicator set.

Transport packets also contain a continuity counter. When an isodata transport packet is received with its continuity_counter not equal to the continuity_counter value of the last packet received plus one modulo 16 (packet discontinuity error), the following steps will be taken:

1. If the discontinuity indicates a redundant packet has been received, the redundant packet shall be discarded.
2. If the discontinuity indicates two or more packets were lost, the PTS pointers will be cleared, the isodata output mode will be set to muted data, and the PTS acquire state 128 will be returned to.
3. If the discontinuity indicates one packet was lost, then:
    A. If the PES counter indicates 184 or more bytes remain to be received for the current PES, the PES counter will be decremented by 184 and the FIFO write pointer will be advanced by 184 byte addresses (92 words) to effectively insert 184 bytes into the FIFO to compensate for the lost packer's payload. It should be noted that when the number of bytes lost with a missing packet is less than the number of bytes inserted into the FIFO, it is possible that the FIFO will overflow.
    B. If the PES counter indicates exactly zero bytes remain to be received for the current PES, the PES counter will be set to the value of the previous PES_packet_length, the PES counter will be decremented by 178 and the FIFO write pointer will be advanced by 164 byte addresses. When the number of bytes lost with a missing packet is less than the number of bytes inserted into the FIFO, it is possible that the FIFO will overflow.
    C. If the PES counter indicates N (between one and 183) bytes inclusive remain to be received for the current PES, the PES counter will be decremented by N and the FIFO write pointer will be advanced by N byte addresses to effectively insert N bytes into the FIFO to compensate for the lost packer's payload. When the number of bytes lost with a missing packet is less than the number of bytes inserted into the FIFO, it is possible that the FIFO will overflow.

As PES data is parsed, the value of the PES counter will be monitored. If a PES byte is parsed when the PES counter is zero (before decrementing the counter to account for the current PES byte), and this byte is not the first byte of a new PES, too many bytes were written to the FIFO due loss of one or more previous transport packets. When this occurs, the process will stop writing isodata presentation units to the FIFO beginning with the current byte and shall return to the PTS acquire state after flushing the FIFO and clearing the PTS pointers.

After each presentation unit is removed from the FIFO, the process detects when the FIFO read pointer equals the DRAM offset address of the oldest PTS pointer. When this occurs, timing is verified in the following manner:

If the STC is less than PTS+pts_ext8+data_PTS_offset of the corresponding PTS pointer, as will be the case when isodata is lost, fill bits (e.g., zeros) will be output for isodata until STC=PTS+pts_ext8+data_PTS_offset. At this time, fill bits will continue to be output for isodata until the presentation unit counter equals $0_{10}$ ($0000_2$). When this occurs, reading of isodata presentation units from the FIFO will resume and this data will be presented as isodata. If the STC is greater than or equal to PTS+pts_ext8+data_PTS_offset of the corresponding PTS pointer, normal isodata processing will continue.

During isodata processing, timing will be monitored in the following manner:

If, during the time interval that the presentation unit counter first equals zero after STC=PTS+pts_ext8+data_PTS_offset of a PTS pointer, the FIFO read pointer does not equal the FIFO address of the corresponding PTS pointer, the processing will be interrupted (FIFO output late error) and the enter acquisition state 124 will be reentered.

In a preferred implementation of the process described above, the following specifications are used:

data_PTS_offset

A 13 bit value representing the number of PTS clock ticks which is added to each PTS value and pts_ext8 value to control the time delay applied to isodata. This value has units of 11.1 μseconds and allows isodata to be delayed by as much as 90.9 milliseconds.

PTS Pointer

Each PTS pointer shall include the following fields, allowing a particular presentation unit in the FIFO to be pointed to and allowing the time at which it is to be presented to be stored with a resolution of 74 nanoseconds.

PTS

A 16 bit field with units of 11.1 μseconds which stores the 16 least significant bits of the corresponding presentation unit's PTS. 16 bits allows isodata to remain in the FIFO for as long as 727.4 milliseconds.

PTS_Ext8

An 8 bit field with units of 74 nanoseconds which stores the upper 8 bits of the 9 bit pcr_extension specified by MPEG in *Generic Coding of Moving Pictures and Associated Audio, international Standards Organization*, ISO/IEC 13818-1, Systems International Standard, November, 1994. This field corresponds to the time stamp of the presentation unit and extends the time resolution of isodata time stamps beyond the standard of 11.1 μseconds specified by MPEG to 74 nanoseconds.

DRAM Offset Address

A 12 Bit DRAM word offset address relative to the isodata base address which points to the DRAM word of the FIFO at which the corresponding presentation unit is stored. 12 bits allows the FIFO to be as large as 4096 words.

in-use Flag

A one bit flag to allow the status of a PTS pointer to be determined. When set, this flag indicates the PTS pointer is in-use in that it contains a valid set of values. Every pointer shall have this flag cleared after a reset of the isodata process.

PTS Pointer Maintenance

The two PTS pointer registers 176, 178 are maintained in the following manner:

I. After reset, all PTS pointer register in-use flags are reset (set to not in-use).

II. As a PTS value is received, the PTS value in the PES header is stored in the PTS field of the OLD PTS pointer register.

III. The pts_ext8 field is then parsed from the isodata header and stored in the pts_ext8 field of the OLD PTS pointer register.

IV. After a new PTS value is stored into a PTS pointer register, isodata processing continues. If the next presentation unit is received and written into the FIFO correctly, the DRAM offset address which corresponds to the FIFO address holding the first byte of the presentation unit is stored in the pointer's DRAM offset address field. The next presentation unit is received and written into the FIFO correctly when no data is lost for any reason between reception of the PTS value and reception of the first presentation unit of the same PES_packet. With this accomplished, the PTS pointer is valid and will be marked as in-use by setting the in-use flag of the same PTS pointer register and will be considered the newest PTS pointer in subsequent processing.

V. When a PTS pointer is being recorded and none of the PTS pointer registers are in-use, the pointer is recorded into OLD PTS pointer register.

VI. When the OLD PTS pointer register is in-use when a new pointer is ready to be recorded, the new pointer will be recorded into the NEW PTS pointer register.

VII. When both of the PTS pointer registers are in use, the new pointer will be recorded by overwriting the NEW PTS pointer.

VIII. The PTS pointers are employed as specified in the preceding description of the track state 132.

IX. Once used as specified in the track state, the NEW PTS pointer shall be transferred to the OLD PTS pointer and the NEW PTS pointer shall be marked unused by clearing its in-use flag so that the NEW pointer register is used to store the next PTS pointer.

X. When a transport packet is received on the isodata PID with the discontinuity_indicator bit of its adaptation field set, the in-use flag of all PTS pointer registers shall be cleared and no PTS pointers shall be stored until the next PCR value is received (e.g., on the isodata PCR PID).

To aid error detection, each received payload byte on the isodata PID is counted for comparison to the PES_packet_length indicated in each PES header as defined by MPEG. Thus, as the beginning of each PES_packet is received, the PES_packet_length will be stored into PES length counter 170. This counter will be decremented by one as each PES byte is parsed. Further, this counter will be used and maintained as specified for the track state 132.

In addition to the PES length counter, the preferred system maintains the aforementioned presentation unit counter 164. The presentation unit counter is a 4 bit counter which is incremented by the isodata output clock. This counter is set to $8_{10}$ ($1000_2$) upon output of the first isodata presentation unit from the FIFO as described for the PTS sync state 130. Subsequent entries into the PTS sync state shall not set or reset this counter unless the acquisition state 124 has been entered since the last entry into the PTS sync state.

Four isodata output modes are implemented as follows:

1. Tristated—in this mode, both the isodata clock and data outputs are tristated;

2. Muted_clock_and_data—in this mode, both the isodata clock and data outputs shall be low (e.g., zero);

3. Muted_data—in this mode, only the isodata output is low while the isodata clock is active;

4. Unmuted—in this mode, neither the isodata or clock outputs are muted (not active).

A unique error flag is set for each error condition, which will be reset after the flag is read. Each error condition which interrupts the isodata process is maskable. Table 1 lists the various error conditions related to isodata processing and the system's response to the error. The following defines the table's contents:

Name

A name assigned to each error condition for reference elsewhere herein.

Definition

A definition of the conditions which indicate the corresponding error has occurred.

Int yes—indicates that isodata processing is to be interrupted when this error occurs.

no—indicates that isodata processing is not interrupted when this error occurs.

Check State and Next State

>"state"—indicates this error will be detected when the current isodata processing state is higher than "state". The following list defines the isodata processing state hierarchy:
1. Reset Lowest
2. Startup
3. Acquisition
4. Setup_Wait
5. PTS_Acquire
6. PTS_Sync
7. Track Highest ≥"state"—Indicates this error shall be detected when the isodata processing state is equal to or higher than "state".

startup, acquisition, setup_wait, pts_acquire, pts_sync, or track—Indicates this error shall be detected in this state or that isodata processing shall proceed to this state after the associated actions are carried out.

same—indicates that isodata processing will stay in the same state after the associated actions are carried out.

all—indicates this error will be detected when it occurs in any processing state.

FIFO Action flush—Indicates that the FIFO is flushed by setting the FIFO read and write pointers to be equal to the FIFO's DRAM base address.

none—indicates no change from normal FIFO management shall occur.

Pointer Action clear—Indicates the PTS pointers are returned to the state specified as if the process had been reset.

none—indicates no change from normal pointer management shall occur.

see other actions—Indicates Other Actions may indicate a pointer to be set or reset, otherwise treated as none.

Output Mode

States the output mode to which the processor shall transition.

Other Actions

States any additional actions required as a result of the error.

TABLE 1

Summary of Errors, Exceptions, and Actions

| Name | Definition | Int | Check State | Next State | FIFO Action | Pointer Action | Output Mode | Other Actions |
|---|---|---|---|---|---|---|---|---|
| iso_reset | Processor is reset via the internal register bit | no | all | reset | flush | clear | tristated | reset all pts pointer in-use flags |
| force_startup | Isodata PID is set to invalid via the internal register bit | no | all | startup | flush | clear | muted clock and data | none |
| mute | Processor commanded to mute via the internal register bit | no | all | same | none | none | muted clock and data | none |
| setup_request | Processor receives an increment value and stores this in the internal register | yes | acquisition | setup wait | none¹ | none¹ | muted clock and data | none |
| proceed_cmd | Processor is commanded to proceed in isodata processing via the internal register bit | no | setup wait | pts acquire | none | none | muted clock and data | none |
| pts_err | stc > pts+pts_ext8+data_pts_offset | yes | pts sync | acquisition | none¹ | none¹ | muted clock and data | none |
| overflow | fifo write pointer equals fifo read pointer when data must be stored into the fifo | yes | pts sync | pts acquire | flush | clear | muted clock and data | none |
| overflow | fifo write pointer equals fifo read pointer when data must be stored into the fifo | yes | track | pts acquire | flush | clear | muted data | none |
| underflow | fifo read pointer equals fifo write pointer when data must be removed from the fifo | yes | track | pts acquire | flush | clear | muted data | none |
| enc_err | Processor receives a transport packet on the isodata PID whose transport_scambling_control indicates it is encrypted | yes | >startup | same or acquisition; see other actions | none | none | same | other error conditions may apply in this case |
| redundant | Processor receives a transport packet on the isodata PID whose continuity counter indicates it is a redundant packet | no | >startup | same | none | none | same | discard packet |
| packet_err_a | Processor receives a transport packet on the isodata PID whose continuity_counter indicates one or more isodata packets have been lost | no | acquisition and pts acquire | same | none | none | same | return to waiting for a packet with the payload_unit_start_indicator set |
| packet_err_b | Processor receives a transport packet on the isodata PID whose continuity_counter indicates one or more isodata packets have been lost | no | pts sync | pts acquire | flush | clear | same | none |
| packet_err_c2 | Processor receives a transport packet on the isodata PID whose continuity_counter indicates two or more isodata packets have been lost | no | track | pts acquire | flush | clear | same | none |
| packet_err_c1 | Processor receives a transport packet on the isodata PID whose continuity_counter indicates one | no | track | same or pts acquire; see other actions | see other actions | see other actions | same | IF PES counter indicates ≧184 bytes remain in the PES, decrement PES counter by 184 |

TABLE 1-continued

Summary of Errors, Exceptions, and Actions

| Name | Definition | Int | Check State | Next State | FIFO Action | Pointer Action | Output Mode | Other Actions |
|---|---|---|---|---|---|---|---|---|
| | isodata packet has been lost | | | | | | | bytes and advance FIFO write pointer by 184 bytes. If PES counter indicates zero bytes remain in the PES, set PES counter to PES_packet_length of previous PES, decrement PES counter by 184 bytes and advance FIFO write pointer by 184 bytes. If PES counter indicates N(1-183) bytes remain in the PES, decrement PES counter by N bytes and advance FIFO write pointer by N bytes. |
| pes_count_err | PES counter is zero when a PES byte is parsed which is not the first byte of a PES | no | track | pts_acquire | flush | clear | same | none |
| late_read | fifo read pointer is not equal to pts pointer dram address when presentation unit counter is first zero after stc = pts+pts_ext8+data_pts_offset of the same pts pointer | yes | track | acquisition | flush | clear | muted clock and data | none |
| acquire | processor is commanded to enter the acquisition state by writing to the Isodata PID register while the PID Valid flag is set | no | ≧startup | acquisition | flush | clear | muted clock and data | none |
| pcr_dis_1 | a transport packet on the isodata PCR PID is received with the discontinuity_indicator bit of its adaptation field set | no | pts_acquire or track | same | none | clear | same | processor shall stop storing PTS values in the PTS pointers until after reception of the next PCR value on the isodata PCR PID. |
| pcr_dis_2 | a transport packet on the isodata PCR PID is received with the discontinuity_indicator bit of its adaptation field set | no | pts_sync | pts_acquire | flush | clear | same | processor shall stop storing PTS values in the PTS pointers until after reception of the next PCR value on the isodata PCR PID. |

[1] The preferred implementation flushes the FIFO and clears the pointers.

A set of registers is maintained to control and keep track of the status of the isodata process. The set of registers is specified in Table 2.

TABLE 2

Isodata Registers

| Register Name | #.Bits | Type | Definition |
|---|---|---|---|
| increment | 32 | read | value of increment field from most recently received isodata header |
| PID | 13 | read/write | PID value to use in filtering transport packets for isodata processing |
| PID reset flag | 1 | read/write | processor shall move from the startup state to the acquisition state when this flag is reset, shall enter the startup state when this flag is cleared |
| PID valid flag | 1 | read/write | processor shall move to the acquisition state when set |
| mute | 1 | read/write | Isodata output mode shall be muted data when set, shall be determined by state when cleared |
| interrupt status | 6 | read | setup request<br>pts err<br>overflow<br>underflow<br>late read |
| sync state | 3 | read | reset, startup, acquisition, setup wait, pts acquire, pts sync, or track |
| data_pts_offset | 13 | read/write | number of 11.1 µ second ticks to add to PTS to determine proper time to begin output of the associated presentation unit |
| FIFO DRAM base address | 11 | read/write | base word address in DRAM at which isodata FIFO shall reside |
| interrupt mask | 6 | read/write | shall provide individual interrupt mask for each interrupt status bit defined above |
| proceed | 1 | read/write | clear processor when setup wait state is entered, isodata processor shall enter the pts acquire state when this is set |

It should now be appreciated that the present invention provides a method and apparatus for detecting and recovering from errors when communicating information data, such as isochronous data, in an MPEG-2 type transport stream. The isochronous data follows a PES header in the payload portion of a packetized elementary stream. The PES payload begins with an isochronous data header which is followed by isochronous data presentation units. Isodata transport packets are monitored to locate isodata presentation time stamps (PTSs), and the presentation of isodata from a buffer is synchronized to a system time clock (STC) using timing information derived from the PTSs. Discontinuity errors between isodata packets are identified and where possible, a write pointer of the buffer is advanced by a suitable number of bits to compensate for the discontinuity. Synchronization of the presentation with respect to the STC is maintained during the error recovery process. A presentation unit count and PES count are maintained to detect lost data. Output timing is verified using a PTS extension and PTS offset. A pair of PTS pointers is used to verify correct data output timing. Additional error detection and recovery techniques are also disclosed.

Although the invention has been described in connection with a preferred embodiment, it should be appreciated that numerous adaptations and modifications may be made thereto without departing from the spirit and scope of the invention as set forth in the claims.

We claim:

1. A method for managing errors in isochronous data ("isodata") received in bursts from a packetized data stream carrying isodata presentation units in fixed length isodata transport packets, each of said transport packets including a packet identifier (PID) and at least some of said packets containing a presentation time stamp (PTS) indicative of a time for commencing the fixed rate presentation of isodata presentation units from a buffer into which they are temporarily stored upon receipt, said method comprising the steps of:

monitoring said data stream to detect PIDs identifying said isodata transport packets;

monitoring the isodata transport packets identified by said PIDs to locate isodata PTSs;

synchronizing the presentation of said presentation units from said buffer to a system time clock (STC) using timing information derived from the located isodata PTSs;

identifying discontinuity errors between successive ones of said isodata transport packets and, if a discontinuity of no more than one packet is identified, advancing a write pointer of said buffer by a suitable number of bits to compensate for the discontinuity, while maintaining the synchronization of said presentation with respect to said STC.

2. A method in accordance with claim 1 wherein first and second PTS pointers are provided, each for maintaining a different PTS value and address of said buffer identifying where a presentation unit referred to by the PTS value is stored, the synchronization of said presentation being maintained by the further steps of:

replacing the PTS value and address for one of said PTS pointers with a new PTS value and new address after data stored at the address associated with the replaced value has been presented from said buffer;

when said new address is reached, suspending the presentation of data from said buffer if said STC is not equal to a presentation time derived from said new PTS value; and if said presentation has been suspended, recommencing the presentation of data from said buffer when said STC reaches said presentation time derived from said new PTS value.

3. A method in accordance with claim 2 wherein new PTS values are received over time from said isodata transport packets, said method comprising the further steps of:

determining if both of said PTS pointers contain PTS values that have not yet been used to present data from said buffer when a new PTS value is received; and if so, replacing the PTS value and associated address in the most recently updated PTS pointer with the new PTS value and new address, thereby maintaining the oldest unused PTS value and address for use in synchronizing the presentation of said presentation units from said buffer.

4. A method in accordance with claim 1 wherein a PTS pointer is provided to maintain a current PTS value together with an address of said buffer identifying where a presentation unit referred to by said current PTS value is stored, the synchronization of said presentation being maintained by the further steps of:

replacing said PTS value in said PTS pointer with a new current PTS value after data stored at said address has been presented from said buffer;

replacing said address in said PTS pointer with a new address corresponding to a presentation unit referred to by said new current PTS value;

when said new address is reached, suspending the presentation of data from said buffer if said STC is not equal to a presentation time derived from said new current PTS value; and if said presentation has been suspended, recommencing the presentation of data from said buffer when said STC reaches said presentation time derived from said new current PTS value.

5. A method in accordance with claim 4 wherein the presentation units carried by said packetized data stream are supplied by packetized elementary stream (PES) packets carrying the presentation units together with information indicative of the length of each PES packet, said method comprising the further steps of:

determining if an amount of presentation unit data actually received for a given PES packet differs from an amount of data that should be received as indicated by the PES packet length information; and indicating an error if the compared amounts of data do not match.

6. A method in accordance with claim 5 comprising the further steps of:

clearing said PTS pointer and temporarily stalling the presentation of data from said buffer in the event additional presentation unit data continues to arrive in the absence of a new PES packet indicator after said PES packet length information indicates that all data has been provided for said given PES packet; and recommencing the presentation of data from said buffer based on a new PTS value provided in said PTS pointer after the PTS pointer has been cleared.

7. A method in accordance with claim 5 wherein first and second PTS pointers are provided, each for maintaining a different PTS value and address of said buffer identifying where a presentation unit referred to by the PTS value is stored, with new PTS values being received over time from said isodata transport packets, said method comprising the further steps of:

determining if both of said PTS pointers contain PTS values that have not yet been used to present data from said buffer when a new PTS value is received, and if so, replacing the PTS value and associated address in the most recently updated PTS pointer with the new PTS value and new address, thereby maintaining the oldest unused PTS value and address for use in synchronizing the presentation of said presentation units from said buffer;

clearing both of said PTS pointers and temporarily stalling the presentation of data from said buffer in the event additional presentation unit data continues to arrive in the absence of a new PES packet indicator after said PES packet length information indicates that all data has been provided for said given PES packet; and recommencing the presentation of data from said buffer based on a new PTS value provided in one of said PTS pointers after the PTS pointers have been cleared.

8. A method in accordance with claim 1 wherein;

the isodata presentation units carried in said fixed length isodata transport packets are obtained from isodata packetized elementary stream (PES) packets, and said suitable number of bits for advancing said write pointer is determined in response to a count of PES payload bytes retrieved from the isodata transport packets.

9. A method in accordance with claim 8 wherein said fixed length isodata transport packets each comprise 188 bytes, and;

if said count indicates that at least 184 bytes remain to be received for said current PES packet, said count is decremented by 184 and said write pointer is advanced by 184 byte addresses;

if said count indicates that no bytes remain to be received for the current PES packet, said count is set to the value of a previous PES packet length and then decremented by 178, and said write pointer is advanced by 164 byte addresses; and if said count indicates that N bytes, where $1 \leq N \leq 183$ remain to be received for said current PES packet, said count is decremented by N and said write pointer is advanced by N byte addresses.

10. A method for managing errors in isochronous data ("isodata") received in bursts from a packetized data stream carrying isodata presentation units in fixed length isodata transport packets, each of said transport packets including a packet identifier (PIP) and at least some of said packets containing a presentation time stamp (PTS) indicative of a time for commencing the fixed rate presentation of isodata presentation units from a buffer into which they are temporarily stored upon receipt, said method comprising the steps monitoring said data stream to detect PIDs identifying said isodata transport packets;

monitoring the isodata transport packets identified by said PIPs to locate isodata PTSs;

synchronizing the presentation of said presentation units from said buffer no a system time clock (STC) using timing information derived from the located isodata PTSs, said synchronization step comparing the STC to the timing information derived from the PTSs; and providing fill bits as output until it is time to present said presentation units if said comparison determines that said presentation units are too early to be presented.

11. A method in accordance with claim 10 comprising the further steps of:

retrieving a PTS extension from the identified isodata transport packets to enable the time resolution for presenting isodata presentation units to be increased; and deriving said timing information by summing at least said PTS and said PTS extension.

12. A method in accordance with claim 11 wherein said timing information is derived from the sum of said PTS, said PTS extension, and a PTS offset value used to provide a time delay.

13. A method in accordance with claim 11 comprising the further steps of:
comparing said timing information to said STC to determine whether said presentation units are too late to be presented or ready to be presented from said buffer;
resynchronizing the presentation of presentation units from said buffer if said comparing step determines that said presentation units would otherwise be presented too late; and
presenting said presentation units from said buffer if said comparing step determines that said presentation units are ready to be presented.

14. A method in accordance with claim 10 wherein:
said timing information comprises the sum of at least a PTS and a PTS extension that enables the time resolution for presenting isodata presentation units to be increased; and
said fill bits are provided as output until a time designated by the STC equals the time designated by said sum.

15. A method in accordance with claim 14 wherein said timing information comprises the sum of said PTS, said PTS extension, and a PTS offset value used to provide a time delay.

16. A method in accordance with claim 14 wherein each presentation unit comprises an integer number N bits of isodata, said method comprising the further steps of:
maintaining an N-bit count that is correlated with the presentation of a first presentation unit from said buffer; and
continuing to provide fill bits as output after said STC equals the time designated by said sum until said N-bit count indicates that it is time to commence the presentation of a new presentation unit.

17. A method for managing errors in isochronous data ("isodata") received in bursts from a packetized data stream carrying isodata presentation units in fixed length isodata transport packets, each of said transport packets including a packet identifier (PID) and at least some of said packets containing a presentation time stamp (PTS) indicative of a time for commencing the fixed rate presentation of isodata presentation units from a buffer into which they are temporarily stored upon receipt, said method comprising the steps of:
monitoring said data stream to detect PIDs identifying said isodata transport packets;
monitoring the isodata transport packets identified by said PIDs to locate isodata PTSs;
synchronizing the presentation of said presentation units from said buffer to a system time clock (STC) using timing information derived from the located isodata PTSs, said synchronization step comparing the STC to the timing information derived from the PTSs;
monitoring said isodata transport packets identified by said PIDs to determine if any of them are designated as being encrypted after any encryption should have been removed; and
if a single packet only is designated as being encrypted after any encryption should have been removed, advancing a write pointer of said buffer by a suitable number of bits to ignore the single packet, while maintaining the synchronization of said presentation with respect to said STC.

18. A decoder for receiving and managing errors in isochronous data ("isodata") received in bursts from a packetized data stream carrying isodata presentation units in fixed length isodata transport packets, each of said transport packets including a packet identifier (PID) and at least some of said packets containing a presentation time stamp (PTS) indicative of a time for commencing the fixed rate presentation of isodata presentation units from a buffer into which they are temporarily stored upon receipt, said decoder comprising:
means for monitoring said data stream to detect PIDs identifying said isodata transport packets;
means for monitoring the isodata transport packets identified by said PIDs to locate isodata PTSs;
means for synchronizing the presentation of said presentation units from said buffer to a system time clock (STC) using timing information derived from the located isodata PTSs;
means for identifying discontinuity errors between successive ones of said isodata transport packets and, if a discontinuity of no more than one packet is identified, advancing a write pointer of said buffer by a suitable number of bits to compensate for the discontinuity, while maintaining the synchronization of said presentation with respect to said STC.

19. A decoder in accordance with claim 18 wherein first and second PTS pointers are provided, each for maintaining a different PTS value and address of said buffer identifying where a presentation unit referred to by the PTS value is stored, the synchronization of said presentation being maintained by means for:
replacing the PTS value and address for one of said PTS pointers with a new PTS value and new address after data stored at the address associated with the replaced value has been presented from said buffer;
when said new address is reached, suspending the presentation of data from said buffer if said STC is not equal to a presentation time derived from said new PTS value; and
recommencing the presentation of data from said buffer when said STC reaches said presentation time derived from said new PTS value if said presentation has been suspended.

20. A decoder in accordance claim 19 wherein new PTS values are received over time from said isodata transport packets, said decoder further comprising:
means for determining if both of said PTS pointers contain PTS values that have not yet been used to present data from said buffer when a new PTS value is received; and
means responsive to said determining means when neither of the PTS values in said pointers have been used when a new PTS value is received, for replacing the PTS value and associated address in the most recently updated PTS pointer with the new PTS value and new address, thereby maintaining the oldest unused PTS value and address for use in synchronizing the presentation of said presentation units from said buffer.

21. A decoder in accordance with claim 18 wherein a PTS pointer is provided to maintain a current PTS value together with an address of said buffer identifying where a presentation unit referred to by said current PTS value is stored, the synchronization of said presentation being maintained by means for:
replacing said PTS value in said PTS pointer with a new current PTS value after data stored at said address has been presented from said buffer;

replacing said address in said PTS pointer with a new address corresponding to a presentation unit referred to by said new current PTS value;

suspending the presentation of data from said buffer if said STC is not equal to a presentation time derived from said new current PTS value when said new address is reached; and recommencing the presentation of data from said buffer when said STC reaches said presentation time derived from said new current PTS value if said presentation has been suspended.

22. A decoder in accordance with claim 21 wherein the presentation units carried by said packetized data stream are supplied by packetized elementary stream (PES) packets carrying the presentation units together with information indicative of the length of each PES packet, said decoder further comprising:

means for determining if an amount of presentation unit data actually received for a given PES packet differs from an amount of data that should be received as indicated by the PES packet length information; and means responsive to said determining means for indicating an error if the compared amounts of data do not match.

23. A decoder in accordance with claim 22 further comprising:

means for clearing said PTS pointer and temporarily stalling the presentation of data from said buffer in the event additional presentation unit data continues to arrive in the absence of a new PES packet indicator after said PES packet length information indicates that all data has been provided for said given PES packet; and means for recommencing the presentation of data from said buffer based on a new PTS value provided in said PTS pointer after the PTS pointer has been cleared.

24. A decoder in accordance with claim 22 wherein first and second PTS pointers are provided, each for maintaining a different PTS value and address of said buffer identifying where a presentation unit referred to by the PTS value is stored, with new PTS values being received over time from said isodata transport packets, said decoder further comprising means for:

determining if both of said PTS pointers contain PTS values that have not yet been used to present data from said buffer when a new PTS value is received, and if so, replacing the PTS value and associated address in the most recently updated PTS pointer with the new PTS value and new address, thereby maintaining the oldest unused PTS value and address for use in synchronizing the presentation of said presentation units from said buffer;

clearing both of said PTS pointers and temporarily stalling the presentation of data from said buffer in the event additional presentation unit data continues to arrive in the absence of a new PES packet indicator after said PES packet length information indicates that all data has been provided for said given PES packet; and recommencing the presentation of data from said buffer based on a new PTS value provided in one of said PTS pointers after the PTS pointers have been cleared.

25. A decoder in accordance with claim 18 wherein:

the isodata presentation units carried in said fixed length isodata transport packets are obtained from isodata packetized elementary stream (PES) packets, and a counter provides a count of PES payload bytes retrieved from the isodata transport packets, said suitable number of bits for advancing said write pointer being determined in response to said count.

26. A decoder in accordance with claim 25 wherein said fixed length isodata transport packets each comprise 188 bytes, and:

if said count indicates that at least 184 bytes remain to be received for said current PES packet, said count is decremented by 184 and said write pointer is advanced by 184 byte addresses;

if said count indicates that no bytes remain to be received for the current PES packet, said count is set to the value of a previous PES packet length and then decremented by 178, and said write pointer is advanced by 164 byte addresses; and if said count indicates that N bytes, where $1 \leq N \leq 183$ remain to be received for said current PES packet, said count is decremented by N and said write pointer is advanced by N byte addresses.

27. A decoder for receiving and managing errors in isochronous data ("isodata") received in bursts from a packetized data stream carrying isodata presentation units in fixed length isodata transport packets, each of said transport packets including a packet identifier (PID) and at least some of said packets containing a presentation time stamp (PTS) indicative of a time for commencing the fixed rate presentation of isodata presentation units from a buffer into which they are temporarily stored upon receipt, said decoder comprising:

means for monitoring said data stream to detect PIDs identifying said isodata transport packets;

means for monitoring the isodata transport packets identified by said PIDs to locate isodata PTSs;

means for synchronizing the presentation of said presentation units from said buffer to a system time clock (STC) using timing information derived from the located isodata PTSs; and means for providing fill bits as output until it is time to present said presentation units if said comparison determines that said presentation units are too early to be presented.

28. A decoder in accordance with claim 27 further comprising:

means for retrieving a PTS extension from the identified isodata transport packets to enable the time resolution for presenting isodata presentation units to be increased; and an adder for summing at least said PTS and said PTS extension to provide said timing information.

29. A decoder in accordance with claim 28 wherein said adder provides said timing information by summing said PTS, said PTS extension, and a PTS offset value used to provide a time delay.

30. A decoder in accordance with claim 28 further comprising:

means for comparing said timing information to said STC to determine whether said presentation units are too late to be presented or ready to be presented from said buffer;

means for resynchronizing the presentation of presentation units from said buffer if said comparing step determines that said presentation units are too late to be presented; and means for presenting said presentation units from said buffer if said comparing step determines that said presentation units are ready to be presented.

31. A decoder in accordance with claim 27 further comprising an adder for providing said timing information by summing at least a PTS and a PTS extension that enables the time resolution for presenting isodata presentation units to be increased, wherein:

said fill bits are provided as output until a time designated by the STC equals a time designated by said timing information.

32. A decoder in accordance with claim 31 wherein said adder computes said timing information by summing said PTS, said PTS extension, and a PTS offset value used to provide a time delay.

33. A decoder in accordance with claim 31 wherein each presentation unit comprises an integer number N bits of isodata, said decoder further comprising:

an N-bit counter that is correlated with the presentation of a first presentation unit from said buffer;

wherein said fill bits continue to be provided as output after said STC equals the time designated by said sum until said N-bit counter indicates that it is time to commence the presentation of a new presentation unit.

34. A decoder for receiving and managing errors in isochronous data ("isodata") received in bursts from a packetized data stream carrying isodata presentation units in fixed length isodata transport packets, each of said transport packets including a packet identifier (PID) and at least some of said packets containing a presentation time stamp (PTS) indicative of a time for commencing the fixed rate presentation of isodata presentation units from a buffer into which they are temporarily stored upon receipt, said decoder comprising:

means for monitoring said data stream to detect PIDs identifying said isodata transport packets;

means for monitoring the isodata transport packets identified by said PIDs to locate isodata PTSs;

means for synchronizing the presentation of said presentation units from said buffer to a system time clock (STC) using timing information derived from the located isodata PTSs, said synchronization step comparing the STC to the timing information derived from the PTSs;

means for determining if any of the isodata transport packets identified by said PIDs are identified as being encrypted after any encryption should have been removed; and means responsive to said determining means when a single packet only is designated as being encrypted after any encryption should have been removed, for advancing a write pointer of said buffer by a suitable number of bits to ignore the single packet while maintaining the synchronization of said presentation with respect to said STC.

* * * * *